United States Patent
Riggs et al.

(10) Patent No.: US 12,363,498 B2
(45) Date of Patent: Jul. 15, 2025

(54) SYSTEM AND METHOD FOR CREATING SEAT-BASED LOW FREQUENCY AUDIO PLAYBACK

(71) Applicant: Harman International Industries, Incorporated, Stamford, CT (US)

(72) Inventors: Jason Riggs, Henderson, NV (US); Jeong-Woo Kim, Porter Ranch, CA (US); Joy Lyons, Seattle, WA (US); Thomas Wahnish, North Hollywood, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 321 days.

(21) Appl. No.: 18/299,963

(22) Filed: Apr. 13, 2023

(65) Prior Publication Data

US 2024/0349006 A1 Oct. 17, 2024

(51) Int. Cl.
*H04S 7/00* (2006.01)
*G06F 3/16* (2006.01)
(Continued)

(52) U.S. Cl.
CPC .............. *H04S 7/305* (2013.01); *G06F 3/165* (2013.01); *H04R 1/025* (2013.01); *H04R 3/12* (2013.01);
(Continued)

(58) Field of Classification Search
CPC ......... H04S 7/305; H04S 1/007; H04R 1/025; H04R 3/12; H04R 5/023; H04R 2499/13; G06F 3/165; G10K 2210/3221
See application file for complete search history.

(56) References Cited

U.S. PATENT DOCUMENTS 9,813,835 B2 * 11/2017 Christoph ............... H04S 7/305
9,860,643 B1 * 1/2018 Oswald .................... H04R 3/14
(Continued)

FOREIGN PATENT DOCUMENTS

| WO | 2022/147320 A1 | 7/2022 |
| WO | 2022/147320 A9 | 7/2022 |
| WO | 2022/147346 A1 | 7/2022 |

OTHER PUBLICATIONS

Goose Stuart et al: "PAZ: In-Vehicle Personalized Audio zones", IEEE Multimedia, IEEE Service Center, Newyork, NY I us, vol. 23, No. 4, Oct. 1, 2016 (Oct. 1, 2016), pp. 32-41, XP011634139, ISSN: 1070-986X, DOI: 10.1109/MMUL.2015.94 [retrieved on Nov. 11, 2016] * the whole document*.
(Continued)

*Primary Examiner* — Jason R Kurr
(74) *Attorney, Agent, or Firm* — Angela M. Brunetti

(57) ABSTRACT

A method for playback of an audio signal at an individual seat-based sound (ISS) system in a coherent listening environment having a plurality of ISS systems and a plurality of listening modes. Each ISS system has a single transducer. A listening mode and a set of playback preferences are selected. A crosstalk cancellation algorithm for the ISS system of interest is generated using impulse response measurements of the audio signal, taken only in an acoustical domain, of a transfer function between the audio signal directly after the single transducer in the ISS system of interest and the audio signal at the head of the listener in the ISS system of interest. The crosstalk cancellation algorithm for the selected listening mode is applied to the audio signal, and the audio signal is played back at the single transducer of the ISS system of interest.

16 Claims, 6 Drawing Sheets

(51) Int. Cl.
*H04R 1/02* (2006.01)
*H04R 3/12* (2006.01)
*H04R 5/02* (2006.01)
*H04S 1/00* (2006.01)

(52) U.S. Cl.
CPC ............ *H04R 5/023* (2013.01); *H04S 1/007* (2013.01); *H04R 2499/13* (2013.01)

(56) References Cited

U.S. PATENT DOCUMENTS

| | | | |
|---|---|---|---|
| 11,159,886 B2* | 10/2021 | Hayashi | H04S 3/002 |
| 2006/0262935 A1* | 11/2006 | Goose | H04S 3/002 381/17 |
| 2014/0348354 A1 | 11/2014 | Christoph et al. | |
| 2021/0092512 A1* | 3/2021 | Corynen | H04R 1/403 |
| 2022/0070587 A1* | 3/2022 | Lopez Zuleta | G10K 11/17817 |

OTHER PUBLICATIONS

Elliott Stephen et al: "An active headrest for personal audio", The Journal of the Acoustical Society of America, American Institute of Physics, 2 Huntington Quadrangle, Melville, NY 11747, vol. 119, No. 5, Jan. 1, 2006 (Jan. 1, 2006), pp. 2702-2709, XP012085329, ISSN: 0001-4966, DOI: 10.1121/1.2188814 * section III; figure 9 *.

* cited by examiner

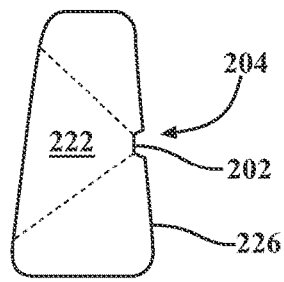
FIG. 2A
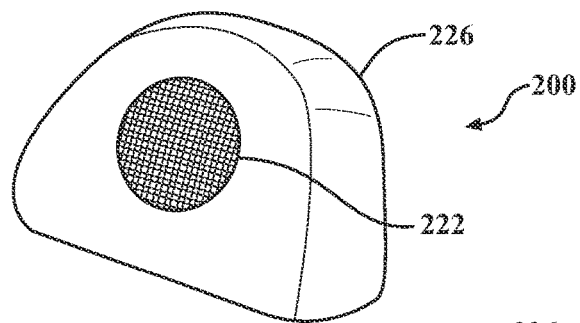
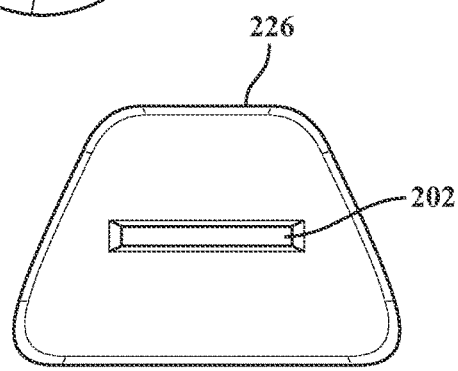
FIG. 2B
FIG. 2C
| | Max SPL | Natural Isolation | Total Isolation |
|---|---|---|---|
| | 40 Hz Average L/R Ear All Seats | Average 40-200 Hz + Graph L/R Ear All Seats | Average 40-200 Hz + Graph L/R Ear All Seats |
| 4 Door Woofers | 118 | 2 | 18 |
| 4 Door Woofers + Subwoofer | 122 | | |
| Dipole Headrest | 104 | 11 | 25 |
| Dipole Headrest + Subwoofer | 117 | | |
| Monopole Headrest | 114 | 8 | 25 |
| Monopole Headrest + Subwoofer | 123 | | |
FIG. 3

SYSTEM AND METHOD FOR CREATING SEAT-BASED LOW FREQUENCY AUDIO PLAYBACK

TECHNICAL FIELD

The present disclosure relates to audio playback in an individual seat-based sound (ISS) system and more particularly, to low-frequency audio playback at an ISS system.

BACKGROUND

Audio systems, and particularly vehicle audio systems, are increasingly based on a seat-based concept, which provides individual, user-preferred listening modes in each seat. The listening modes rely on an arrangement of speakers, and in some instances, headphones may be needed. Alternatively, transducers may be positioned in a headrest to take advantage of its proximity to a head of a listener.

Known systems rely on multiple loudspeakers in a headrest, multiple loudspeakers in an array at the front of the vehicle, or multiple loudspeakers arranged throughout the vehicle cabin. However, there are drawbacks and deficiencies with known systems.

Low frequencies of audio require more air movement to achieve a Sound Pressure Level (SPL) that matches those of higher frequencies. So, for low frequencies (i.e., <200 Hz) there is a need for high volumetric displacement of air movement for lower frequencies. The size of the headrest limits the air movement and the transducer size, which adversely affects low frequency audio playback. Further, merely placing a speaker in the headrest will still present audio that is clearly audible for other listeners in the listening environment. This is particularly true in a small listening environment, such as a vehicle cabin.

For multiple loudspeakers arranged throughout the vehicle cabin, low frequencies are played through large woofers mounted in the vehicle's doors. However, arranging loudspeakers in the vehicle's doors makes them susceptible to debris, vibrations, and rattling noises. Furthermore, low frequencies include several wavelengths below 200 Hz that are proportional to the dimensions of the vehicle cabin. This results in strong modal behavior that may be difficult to control using known systems and methods.

Multiple loudspeakers arranged throughout the vehicle cabin and/or an array of loudspeakers also require a large amount of space for installation. Packaging in a vehicle interior is limited and very valuable, so these arrangements are not always practical. Additionally, audio systems with multiple loudspeakers and multiple sound zones adds complexity to signal processing that requires a large amount of processing power. Processors capable of such processing power are costly and require complicated thermal management.

In a listening environment in a vehicle, situational awareness may be critical to safety for the driver and the passengers. Headphones require user interaction and may inhibit situational awareness and communication with others around the user, making them less than ideal for the driver.

There is a need for improved acoustic sound isolation control with high sound output in a small, confined space, specifically for low frequency output.

SUMMARY

A method for playback of an audio signal at an individual seat-based sound (ISS) system in a coherent listening environment having a plurality of ISS systems and a plurality of listening modes. A listening mode in the plurality of listening modes is selectable at each ISS system in the plurality of ISS systems and each ISS system in the plurality of ISS systems has a single transducer arranged at a head of a listener to playback an audio signal from one or more audio sources.

A listening mode from the plurality of listening modes is selected at an ISS system of interest. And a set of playback preferences for playing back the audio signal at the ISS of interest is selected. A crosstalk cancellation algorithm for the selected listening mode in the plurality of listening modes for the ISS system of interest is generated. The crosstalk cancellation algorithm is generated using impulse response measurements of the audio signal, taken only in an acoustical domain, of a transfer function between the audio signal directly after the single transducer in the ISS system of interest and the audio signal at the head of the listener in the ISS system of interest. The crosstalk cancellation algorithm for the selected listening mode is applied to the audio signal to be played back at the ISS system of interest, and the audio signal is played back at the single transducer of the ISS system of interest with the set of playback preferences.

In one or more embodiments, the single transducer of the ISS system of interest further comprises arranging the single transducer within 6 inches of the head of the listener in the ISS system of interest. In one or more embodiments the coherent listening environment is a vehicle cabin, and each ISS system corresponds to a seat in the vehicle cabin. In one or more embodiments the single transducer is for playback of the audio signal having a frequency less than 200 Hz.

In one or more embodiments, a listener selects a dark mode from the plurality of listening modes. In dark mode the crosstalk cancellation algorithm that cancels out, at the ISS system of interest, any audio signal being played back at any other ISS system in the plurality of ISS systems.

In one or more embodiments, a listener selects a personal mode from the plurality of listening modes. In personal mode the crosstalk cancellation algorithm plays back a first audio signal at the ISS system of interest and cancels out, at the ISS system of interest, any other audio signal being played back at all the other ISS systems.

In one or more embodiments, a listener selects an out-loud mode from the plurality of listening modes. In out-loud mode the crosstalk cancellation algorithm plays back an audio signal at one or more ISS systems, including the ISS system of interest.

DESCRIPTION OF DRAWINGS

FIG. 2A is a perspective view of a transducer in a headrest;

FIG. 2B is a cut-away side view of a transducer in a headrest;

FIG. 2C is a rear view of a transducer in a headrest;

FIG. 3 is a table comparing the sound field inside the vehicle cabin for various transducer configurations in a vehicle door and in a vehicle headrest;

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to FIGS. 1-11C, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Figure 1:
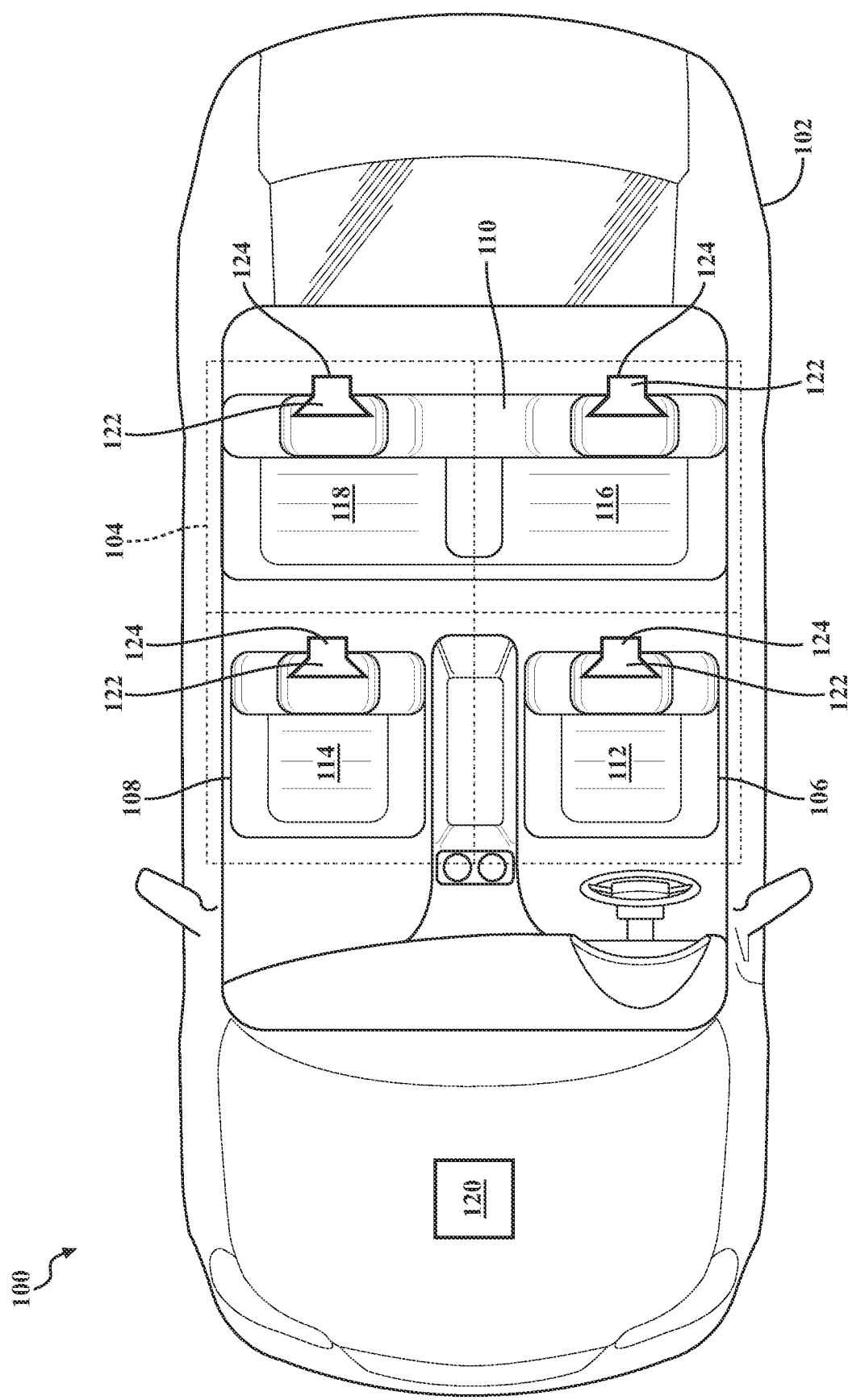
FIG. 1. is an example arrangement for a vehicle having one or more individual seat-based sound (ISS) systems.

FIG. 1 is an example arrangement 100 for a vehicle 102 having a coherent listening environment 104 with a plurality of individual seat-based sound (ISS) systems 112, 114, 116, and 118. In the present example, the listening environment 104 is a cabin of the vehicle 102 having an audio system 120 and the ISS systems 112, 114, 116, and 118 correspond to one or more zones, or listening positions, within the listening environment 104. The zones may correspond with locations of seats in the vehicle cabin. For example, front seats, including a driver seat 106 and a front passenger seat 108 may each be associated with a dedicated ISS 112, 114 of the audio system 120 respectively thereby creating two zones in the front of the listening environment, the front of the vehicle cabin. A rear seat 110 may be associated with two ISS systems 116, 118 of the audio system 120. It should be noted that four ISS systems 112, 114, 116, 118 are shown in the example arrangement 100 of FIG. 1, but there may be fewer or more ISS systems in the listening environment 104. For example, instead of two ISS systems 116, 118 in the rear seat 110, the rear seat 110 may correspond to a single ISS system. Alternatively, the vehicle may not have rear seating, the vehicle may have three zones in the rear seat 110, or the vehicle may have multiple rows of rear seats.

Each ISS system 112, 114, 116, and 118 has at least one transducer 122, also referred to hereinafter as a driver, positioned in a small, open housing 124 at each listening position. In one or more embodiments the transducer 122 is a dipole loudspeaker. The small, open housing 124 may be a headrest at each ISS system 112, 114, 116, 118 in the listening environment 104. The at least one transducer 122 is strategically positioned in the open housing 124 and it is placed within a predetermined distance (i.e., inches) to a head of a listener in the listening position, or zone. The transducer 122 is within inches of a head of the listener. In the example listening environment 104 of a vehicle cabin, the open housing 124 coincides with the headrest.

A headrest 226 is shown in perspective view in FIG. 2A, a side view in FIG. 2B, and a rear view in FIG. 2C. The headrest 226 houses a transducer 222 and has an opening 202 on a backside 204 of the headrest 226 to a rear of the listening environment 104. The opening 202 on the backside 204 of the headrest 226 eliminates back pressure of the transducer 222, which creates a dipole condition of the transducer 222. The opening 204 is on the backside 206 of the headrest 226 to provide a maximum path length from the front to the back of the headrest 226, which in turn, ensures the highest possible output from the dipole condition. It should be noted that the shape of the headrest 226 is shown generically in FIGS. 2A, 2B, and 2C. The actual size and shape of the headrest 226 may be one of many configurations which include the opening 204 on the backside 206 of the headrest 226.

The transducer 222 is sized according to the dimensions of the headrest 226 and a volumetric output of the transducer 222. The overall volumetric displacement of the transducer 222 should not exceed the dimensions of the headrest 226. Further, due to the fact that the headrest 226 is deliberately small, voltages that excite the transducer 222 may be controlled according to the inventive subject matter so that maximum sound pressure level (SPL) in a non-linear operating range may be accurately predicted.

For the listening environment 104 in a vehicle cabin, the audio system 120 would typically have loudspeakers spread throughout the entire cabin. This known arrangement provides poor sound isolation at low frequencies where the sound level is similar for all listening positions, and particularly when loudspeakers are all playing the same content, thereby making the typical loudspeaker arrangement less than ideal for ISS systems. In contrast, a near-field driver, such as the dipole loudspeaker 222 in the headrest 226, has a higher natural separation due to its proximity to a listener in the ISS system relative to the other listening positions.

Also, in the typical loudspeaker arrangement in the vehicle cabin low frequencies are played through large woofers mounted in the vehicle's doors making them susceptible to vibrations and rattling noises. By positioning the dipole loudspeaker 222 in the headrest 226, the inventive subject matter may control the loudspeaker 222 using dampeners and may tune the audio system for haptic feedback thereby enhancing low frequency perception at each listening position independently of the other listening positions. The haptic feedback, which may be the result of a transfer of vibrational energy into the seat, advantageously increases perceived bass levels.

A listener in an ISS system of interest is a near-listener, meaning the listener is in close proximity to the loudspeaker 222. For example, the ISS system within which the listener is seated in the vehicle is the ISS system of interest for that particular near-listener. The near-listener will only receive a signal reproduced by the loudspeaker 222 at the headrest 226 of the ISS system of interest. The signal reproduced by the loudspeaker 222 at the ISS of interest undergoes signal processing for that particular ISS system. This will be described in detail later herein. The signal is processed to generate a crosstalk cancellation algorithm so that it is out of phase with the signals being reproduced at any of the other ISS systems in other listening positions, thereby canceling any cross talk from adjacent listening positions.

FIG. 3 is a comparison table 300 showing modelling of an output level Max SPL 302, natural isolation 304, and total isolation 306, in dB, of the sound field inside the vehicle cabin. The table compares measured test results of isolation numbers for several different loudspeaker arrangements: a typical in-vehicle loudspeaker arrangement having four door woofers 308, a typical arrangement of four door woofers with a subwoofer 310, a dipole loudspeaker in a headrest 312 of the inventive subject matter, a dipole loudspeaker headrest with a subwoofer 314 in a predetermined position (for example, a back of the vehicle interior), a monopole speaker in a headrest 316 (a closed-back of the speaker housing), and a monopole loudspeaker in a headrest with a subwoofer 318 in a predetermined position, i.e., near the rear of the vehicle.

The isolation numbers are averaged across four listening positions 112, 114, 116, and 118 in the vehicle cabin 104. Signals for total isolation 306 have also undergone crosstalk cancellation processing. Each column in table 300 is a comparison of measurements taken at 40 Hz with the ISS system at a driver's (front left) listening position 112 turned on and the other listening positions 114, 116, and 118 set to a silent mode. The graph shows a much clearer separation for the dipole headrest 312, than the loudspeaker arrangement having four door woofers 308.

Figure 4:
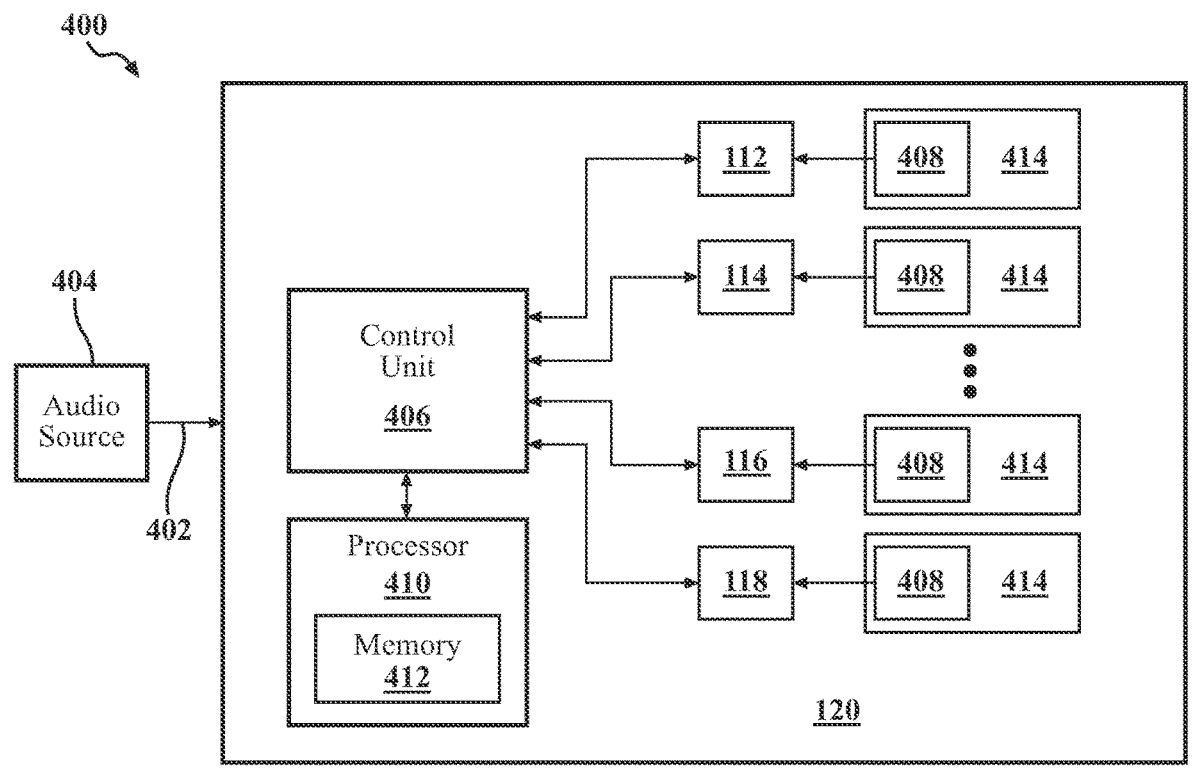
FIG. 4 is a block diagram of a vehicle audio system having a plurality of independent ISS systems.

FIG. 4 is a block diagram 400 of the audio system 120 having a plurality of ISS systems. The audio system 120 receives one or more audio signals 402 from an audio source 404 and drives the transducer at each ISS system (112, 114, 116, 118) independently. The audio source 404 itself may be one or more of a music source, a video source, a navigation source, a phone source, a warning sound, a smart device etc. to name a few examples, which may be wired in the vehicle, connected by wire in the vehicle, or connected wirelessly in the vehicle. Each ISS system is in communication with a control unit 406. The audio signal 402 provided by the audio source 404 may be selected, by a listener, at each ISS system 112, 114, 116, and 118. Therefore, the audio signal 402 may be played out loud at one ISS system or it may be played out loud at multiple ISS systems. Each ISS system may individually select an audio signal from the one or more audio signals so that a different audio signal is being played at each ISS system simultaneously. This will be discussed in detail later herein. Each ISS system communicates, through user input interface 414, with the control unit 406 to select the audio source 404 that supplies the audio signal 404 to be played back at the ISS system. The user input interface 414 is also used by a listener to select a listening mode at each ISS system, and to select playback preferences for the audio signal being played back at each ISS system. Playback preferences may include, but are not limited to, volume, equalization, bass, treble, etc. The control unit 406 has a processor 410 with computer-readable instructions stored in non-transitory memory 412. When executed, the instructions perform one or more functions to control and/or limit operation of the at least one transducer 222 at the ISS system. The user input interface 414 may be a keypad, touch pad, or a graphical user interface from a display or device wired to the control unit 406 or connected wirelessly to the control unit 406 in the vehicle.

The audio system 120 is designed for near-field playback at each ISS system, nominally <0.25 meters. The audio system 120 may be tuned, using signal processing, to maximize low frequency output with high isolation performance. To accomplish this, a plurality of modes of operation 408 may be preset and selectable by the listener in each listening position. The listener may select a mode from the plurality of modes by way of a user interface 414, such as but not limited to a knob, dial, display, or wirelessly by way of a device interface. The modes may include, but are not limited to, all listening positions playing the same audio content out loud, different listening positions playing different audio content, different listening positions playing different audio content, different listening positions having different equalization and/or balance setting for the same audio content, some listening positions playing audio content, some listening positions optimized for silence, and any combination. The user input interface 414 may be a portable device, such as a mobile phone or tablet. Alternatively, or additionally, the user input interface 414 may be a display, console, or other such device for communicating, wired or wirelessly, the user input to the control unit 406.

The transducer in each ISS system is a dipole configuration that has a controlled radiation pattern to minimize sound to the left and right of the headrest while concentrating sound to the front and back of the headrest. Typical roll off at low frequencies is not experienced at each ISS system because the listener is seated in the near-field. Additionally, the signal processing using equalization filter and a cross talk cancelation algorithm for each ISS system tunes the audio system 120 for each mode selected at each listening position.

Figure 5:
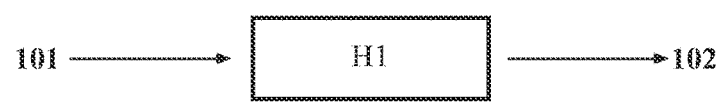
FIG. 5 is a simple system having one input signal and one receiver position in a sound field.

FIG. 5 is a block diagram 500 showing a simple version of the audio system 120 having one input signal 102 and one receiver position in a sound field. H1 is defined by a transfer function H1=102/101 between an output signal 102 and the input signal 101. As an example, for a listener at a first listening position 112 corresponding to the driver seat to hear the exact input signal 102 without bias from the sound field between individual sound systems 112 at the driver seat and 114 at the front passenger seat, a new input $101*H1^{-1}$ is generated that is equal to the output signal 102. The inverse of H1, $H1^{-1}$, would be applied to the input signal 101, thereby making 101 and 102 equal.

Figure 6:
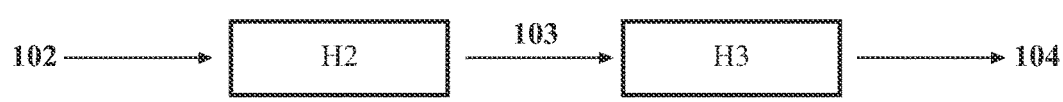
FIG. 6 is a block diagram showing the simple system of FIG. 5 with the speaker system and the acoustic sound field separated.

Unfortunately, in practice, the application of such a solution is not that simple. The input signal 101 is generated in an electrical domain and coupled to an acoustical domain by way of mechanical motion of the transducer 222. Then the output 102 then travels through the sound field to a listener's ears. Effectively, this creates two transmission paths 103, 104 as shown in FIG. 6. FIG. 6 is a block diagram 600 showing separation between the speaker system and the acoustic sound field. In FIG. 6, H2 represents the ISS system 112 in the electrical domain. H3 represents an external sound field in the acoustical domain.

Traditionally, an impulse response method is used to measure the transfer function between 102 and an output at the listener's ears 104 to create a crosstalk canceling filter, or C-matrix. Because H2 is controlled by digital signal processing and H3 is in a free sound field, theoretically it is predictable, and the components should be identifiable in the CTC filter creation process. However, this may not translate well to all frequencies so there are several frequencies that remain unidentified. Regularization is needed to correct this deficiency and the result is a loss of dynamic range and poor computational efficiency.

To combat these drawbacks, the inventive subject matter measures impulse response of the transfer functions only in the acoustical domain. Using an acoustic field transfer function method, H3, a signal in the transmission path 103 right after the transducer and a signal in the transmission path 104 at the ISS system are measured only in the acoustical domain to generate the crosstalk cancellation algorithm, or create the C-Matrix. Only measuring in the acoustical domain bypasses any losses or distortions in the electrical domain. The result is a more lossless transfer function, H3.

CTC filters are then processed in the frequency domain and a Hilbert Transform is applied to convert to the time domain. The result is a preservation of magnitude and phase of the signal in a low frequency domain. An added advantage is that the matrix inversion process is more robust eliminating any need for regularization. The inventive subject matter is more computationally efficient than traditional methods. This will be described in detail later herein. First, the complexities of the transfer function signal path are shown in FIGS. 7-9.

Figure 7:
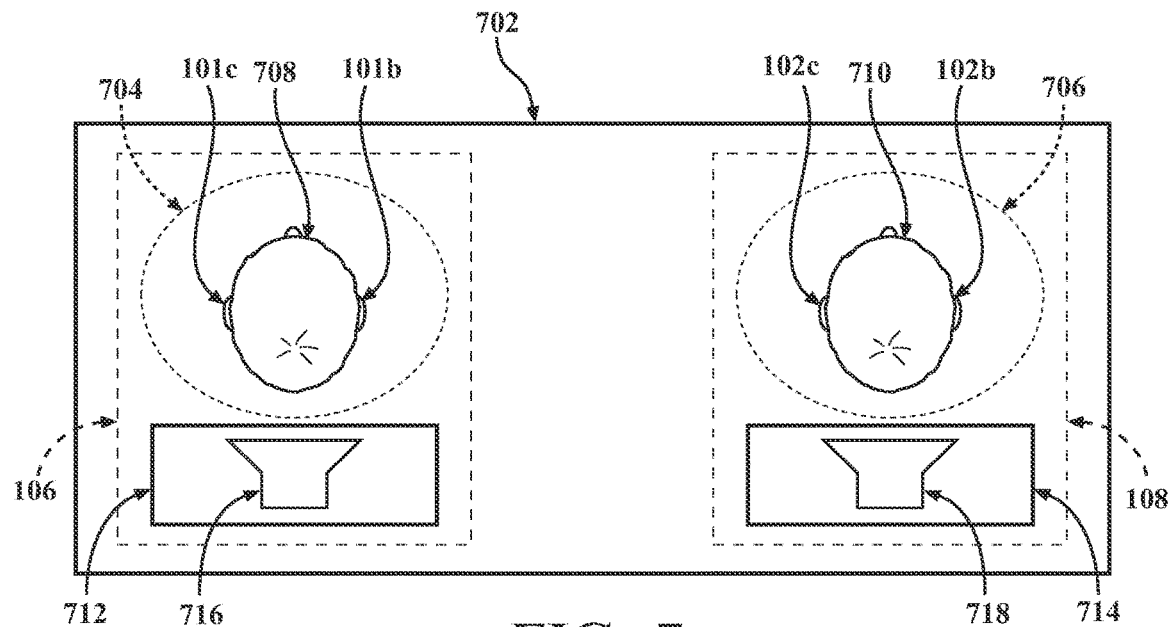
FIG. 7 is a block diagram of two ISS systems in the audio system with CTC filters.

FIG. 7 is a block diagram 700 showing a listening environment 702 with two zones 704, 706 and two distinct input signals at a driver seat 106 and a front passenger seat 108. Each of a first listener 708 and a second listener 710 has their own personal listening zone 704, 706. Each zone has a loudspeaker system, 712, 714. Loudspeaker system 712 has a transducer 716 and loudspeaker system 714 has a transducer 718. The loudspeaker systems 712, 714 are an ISS system dedicated to a respective personal listening zone 704, 706. Each listener 708, 710 chooses, from their respective zone, a listening mode from the plurality of listening modes. For example, when out-loud mode is selected, each listener 708, 710 may listen to the same audio content. Each listener 708, 710 may choose personal mode. In the personal mode the listeners may listen to different audio content with personalized audio settings. In dark mode, one or more listeners 708, 710 may choose to have their zone dark, or quiet. Audio content being played back from anywhere else in the listening environment is blocked at the zone that is in dark mode.

Figure 8:
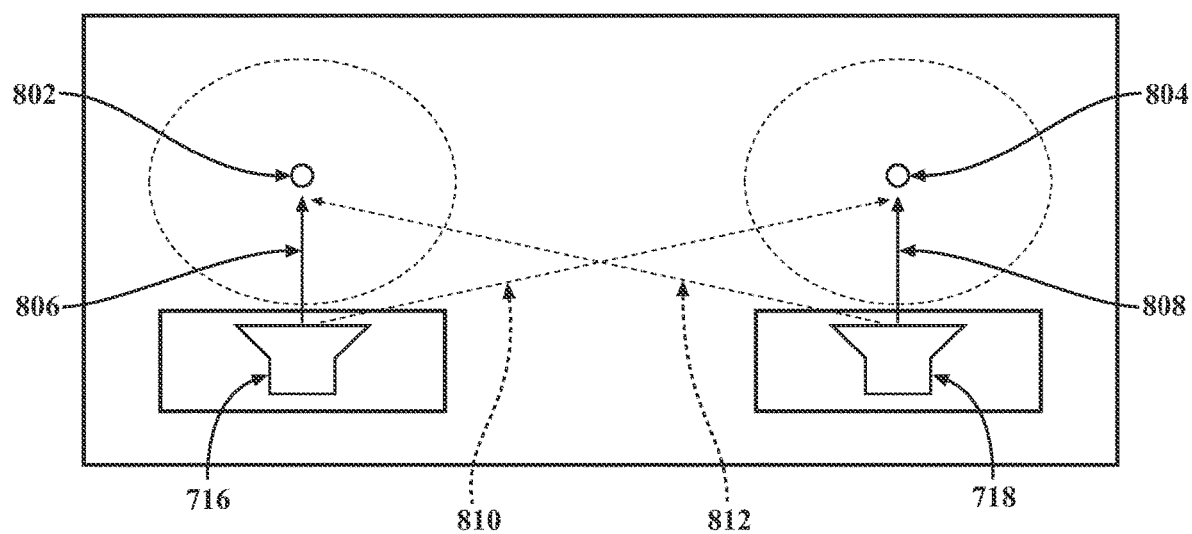
FIG. 8 is a block diagram 800 showing a transfer function signal path for the two ISS systems of FIG. 7.
Figure 9:
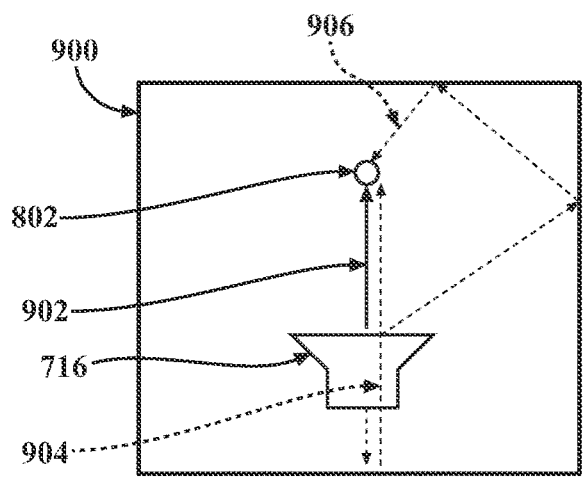
FIG. 9 is a diagram of a transfer function signal path within an acoustic field boundary.

FIG. 8 is a block diagram 800 showing a transfer function signal path for the two-ISS system of FIG. 7. In FIG. 8, microphones 802, 804 are shown for demonstrative purposes only. The microphones are only used during a testing phase and a tuning process to measure the transfer function at the position of the listener 708, 710 in each zone 704, 706. A signal path 806 from the transducer 716 to the first microphone 802 at a location of the first listener 708 is measured. A signal path 808 from the transducer 718 to the second microphone 804 at a location of the second listener 710 is measured. An ipsilateral signal path 810 from the transducer 716 to the second microphone 804 is measured. An ipsilateral signal path 812 from the transducer 718 to the first microphone 802 is measured. The ipsilateral paths are the paths that cancel a signal from the opposite transducer, thereby creating the personal zone.

FIG. 8 shows a direct signal and a signal to an opposite transducer. In a vehicle cabin environment, the transfer function signal path occurs in a reverberant acoustic field. The reverberant acoustic field has a direct path, a rear-reflected path, and a reverberant field path. FIG. 9 demonstrates the transfer function signal path in the reverberant acoustic field for an acoustic field boundary 900. For simplicity purposes, the transfer function signal path is shown for a single speaker. The direct path 902 is shown between the transducer 716 to the first microphone 802. The rear reflected path 904 is a path from the rear of the loudspeaker that is reflected off a rear hard surface behind the transducer 716. The reverberant field path 906, which is more complex, reflects off numerous hard surfaces within the acoustic field boundary 900, such as a window (not shown), or an instrument panel (not shown), or vehicle trim pillars (not shown), or a vehicle headliner (not shown). A single audio input signal will follow each of these paths, causing them to arrive at the microphone 802 (listener 708) at different times.

Figure 10:
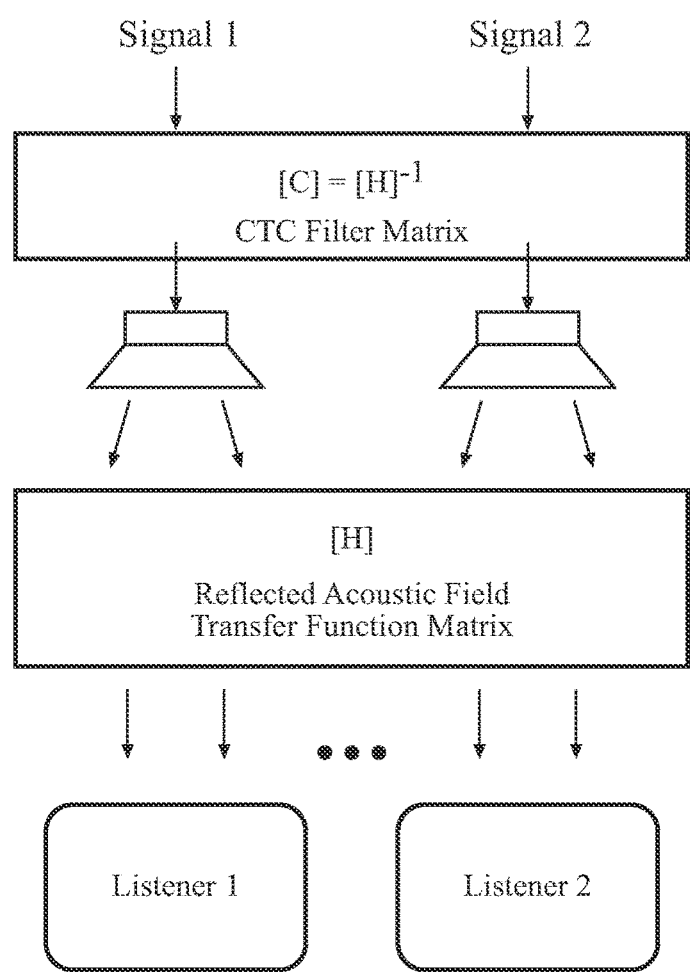
FIG. 10 is a block diagram of the two ISS systems of FIG. 7 with CTC matrices applied.

To address this, the inventive subject matter applies transfer function matrices for cross talk cancellation and a reflected field acoustic path to the audio signal that were created by measuring the transfer function of the signal path in a reverberant acoustic field only in the acoustic domain. FIG. 10 is a block diagram 1000 of the two-ISS system with the matrices applied. A first audio signal 1002 to be played at the first ISS system 112 and a second audio signal 1004 to be played at the second ISS system 114 are each processed with a CTC filter matrix 1006. The first processed signal 1008 is input to a loudspeaker 1010 for the first ISS system and the second processed signal 1012 is input to a loudspeaker 1016 for the second ISS system. An output 1018, 1020 of each loudspeaker 1010, 1016 is subjected to the reflected acoustic field transfer function matrix 1018. A fully processed audio signal 1020 is played back for a listener 708 in the first ISS system 112 and a fully processed audio signal 1022 is played back for the listener 710 in the second ISS system 114. Using the acoustic field transfer function method, as opposed to the impulse response method, a significant amount of interference is removed. This is beneficial for small and complex reflective listening environments, such as a vehicle cabin.

Depending on the listening mode selected by each listener in their ISS system, variations of the filter system will be applied at each ISS system. For example, referring back to FIG. 7, first listener 708 may listen to the same audio content at the same volume as second listener 710 by selecting out-loud mode for the listening mode.

Alternatively, first listener 708 and second listener 710 may choose to listen to the same audio content, each at different volumes, or first listener 708 and second listener 710 may choose to listen to different content. This is accomplished by selecting personal mode. Alternatively, or additionally, first and/or second listeners 708, 710 may choose to have a dark, or quiet, listening mode. Audio content from anywhere else in the listening environment is blocked at the ISS by selecting dark mode.

As explained earlier herein, this is accomplished by the transducer in each ISS system having a dipole configuration with a controlled radiation pattern that minimizes sound to the left and right of the near listener at the headrest while concentrating sound to the front and back of the headrest. Typical roll off at low frequencies is not experienced at each ISS system because the listener is seated in the near-field. Additionally, the signal processing using equalization filter and a cross talk cancelation algorithm for each ISS system tunes the audio system 120 for each listening mode selection at each listening position, or zone.

Figure 11A:
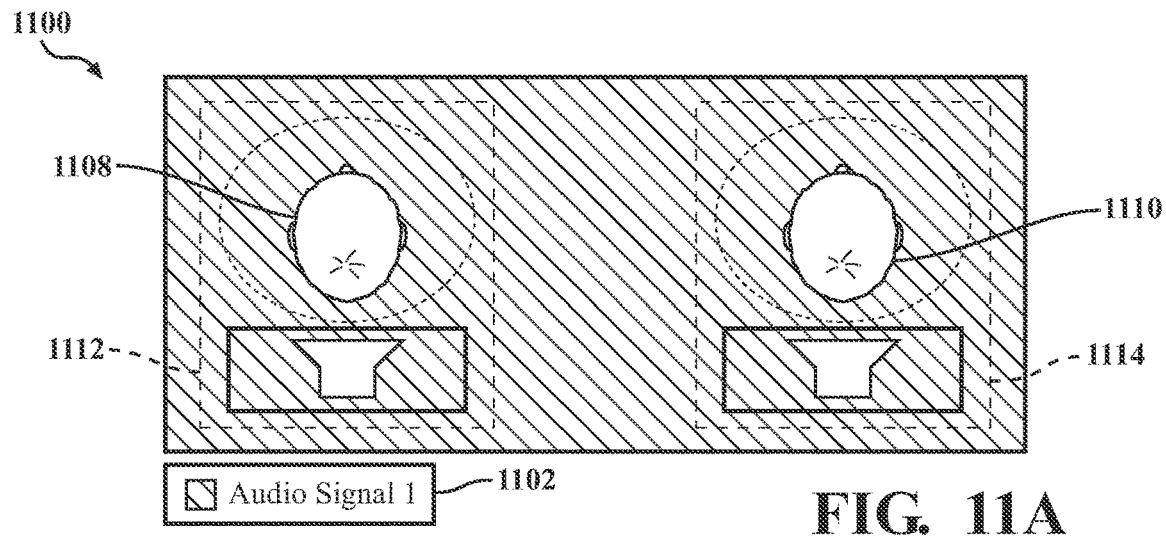
FIG. 11A shows an out-loud listening mode for first and second listeners.

FIG. 11A shows a listening environment 1100 with two ISS systems 1112, 1114. FIG. 11A depicts an out-loud listening mode. The out-loud mode is a listening mode wherein a first audio signal 1102 is being played at each ISS. A first listener 1108, the near listener in the first ISS system 1112, and a second listener 1110, the near listener in the second ISS system, have each selected the same audio signal 1102 for playback. Therefore, same audio signal, for example a music signal, is being played in each ISS system 1112, 1114. The first and second listeners 1108, 1110 may still choose to customize playback in their respective ISS system, for example, the first and second listeners may listen to the audio signal at different audio settings, like volume, for example, as chosen or selected by them, or for them, via the user interface (not shown in FIG. 11A). The audio signal is processed as described earlier herein (see FIG. 10 in particular) so that the first listener 1108 hears the first audio signal 1102 played back at a volume selected by the first listener 1108 and the second listener 1110 hears the first audio signal 1102, played back at a volume selected by the second listener 1110.

Figure 11B:
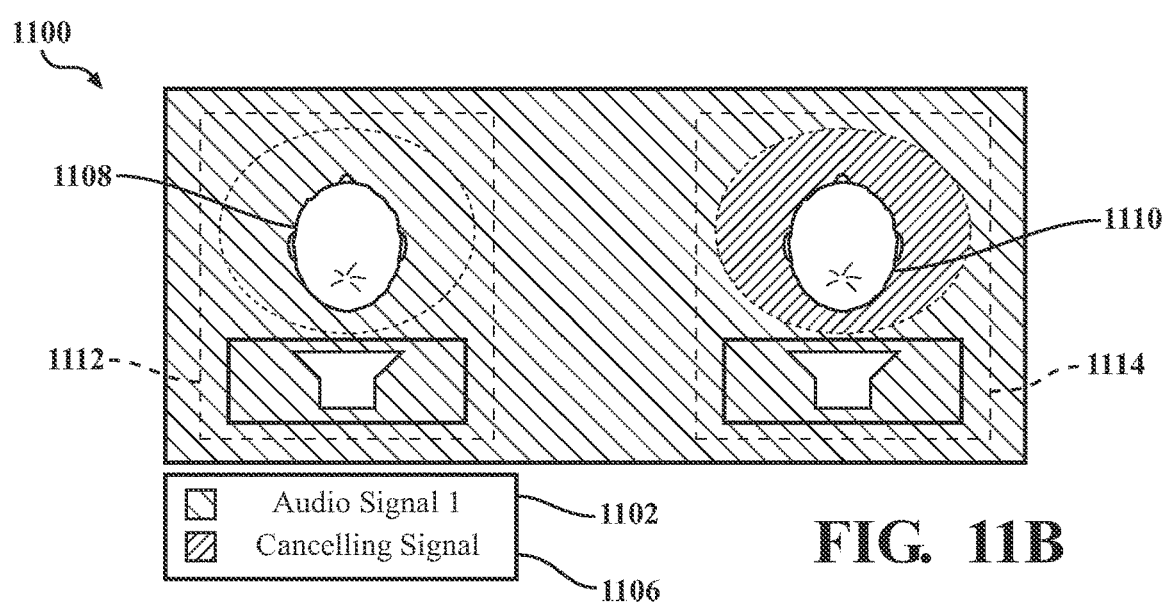
FIG. 11B shows a dark mode for the second listener.

FIG. 11B shows a listening environment 1100 with two ISS systems 1112, 1114. FIG. 11B depicts a dark mode wherein the first listener 1108 has selected playback of the first audio signal 1102 in the first ISS system 1112 and the second listener 1110 has selected dark mode in the second ISS system 1114. In the ISS system 1114 processes the first audio signal 1102 to generate a canceling signal 1106, so that the second listener 1110 does not hear the first audio signal 1102 being played back at the first ISS system 1112.

Figure 11C:
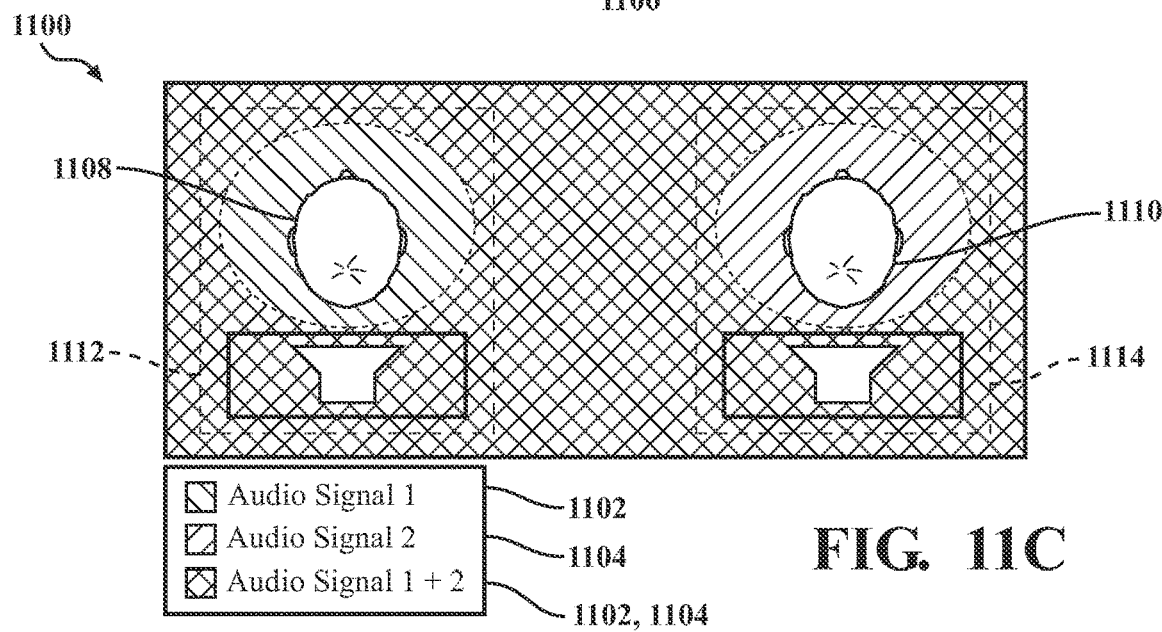
FIG. 11C shows a personal mode for each of the first and second listeners.

FIG. 11C shows a personal listening mode wherein the first listener 1108 has selected playback of the first audio signal 1102 in the first ISS system 1112 and the second listener 1110 has selected playback of the second audio signal 1104 in the second ISS system 1114. In the personal listening mode, the first and second audio signals 1102, 1104 are different from each other. For example, from two different audio input sources, or two different radio stations from a radio audio input source, etc.

The audio signal 1102 is being played back at the first ISS system 1112 with a set of playback preferences, which are settings selected by the first listener 1108. The second audio signal 1104 is being played back at the second ISS system 1114 with a set of playback preferences, which are settings selected by the second listener 1110. The first and second audio signals 1102, 1104 are processed at each ISS system 1112, 1114 so that the first audio signal 1102 is cancelled at the second ISS system 1114 and the second audio signal 1104 is cancelled at the first ISS system 1112. The settings input by each listener 1108, 1110 for playback of the audio signal may also be different in each ISS system.

As discussed earlier herein, the acoustic environment of the vehicle cabin is small and reverberant, so CTC can be particularly challenging for known systems and methods. Yet another issue of an acoustic environment in a vehicle cabin is that a listener will move their head from side to side and rotate their head clockwise or counter-clockwise which requires a wide and stable sound field.

Using the dipole configuration described according to the inventive subject matter yields a wider sweet spot for the listener and a greater low frequency output thereby providing a wide and stable sound field for each listener. Additionally, because the loudspeaker is arranged near the listener in each ISS system, it is beneficial for cross talk cancellation (CTC). The transducer being positioned in the headrest, as opposed to the car door, creates a noticeable difference between the direct path (between the transducer and the listener) and the cross-talk path (between listening positions in the listening environment). Therefore, a greater phase difference between the two signals is provided, which is essential to CTC filter design.

Known systems rely on multiple speakers in the headrest, use multiple speakers in an array at the front of the vehicle, or numerous speakers arranged throughout the vehicle cabin. A further advantage of the inventive subject matter is that a single transducer is used in each ISS system. And due to the proximity of the transducer to the listener, there is no need for a line array to direct audio toward specific locations, eliminating any need for beamforming. This reduces complexity in both hardware and software, which, in turn, reduces processing power that is needed for signal processing as compared to known systems and methods.

Furthermore, several wavelengths below 200 Hz are proportional to the dimensions of the vehicle cabin. This results in strong modal behavior that may be difficult to control using known systems and methods. The inventive subject matter uses only one woofer and focuses on frequencies below 200 Hz. This is advantageous in that the ISS system may be configured for multiple seats in the vehicle cabin without the need for large space in which to house multiple loudspeakers, high power demand, or complicated processing that is needed for beamforming and/or individual speaker delay compensation for an array of loudspeakers.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. An audio system providing at least one audio signal to be played back at an individual seat-based sound (ISS) system in a coherent listening environment having a plurality of ISS systems, each ISS system in the plurality of ISS systems has a single transducer arranged at a head of a listener, the system comprising:
    a plurality of listening modes for each ISS system in the plurality of ISS systems;
    a crosstalk canceling filter associated with an ISS system of interest in the plurality of ISS systems, the crosstalk canceling filter derived from an algorithm using impulse response measurements of the at least one audio signal, taken only in an acoustical domain, of a transfer function between the at least one audio signal directly after the single transducer in the ISS system of interest and the at least one audio signal at the head of the listener in the ISS system of interest;

a user input interface for selecting one listening mode from the plurality of listening modes at the ISS system of interest, the user input interface for setting a set of playback preferences at the ISS system of interest; and a control unit applying the crosstalk canceling filter for the ISS system of interest and the selected listening mode to the at least one audio signal for playback at the single transducer in the ISS system of interest and canceling, at the ISS system of interest, the at least one audio signal from the other ISS systems in the plurality of ISS systems and reverberant reflections of the coherent listening environment.

2. The system as claimed in claim 1, wherein the plurality of listening modes further comprises:

a dark mode, which when selected at the user input interface for the ISS system of interest, cancels any audio signal being played back in the coherent listening environment from being heard by the listener in the ISS system of interest.

3. The system as claimed in claim 1, wherein the plurality of listening modes further comprises:

a personal mode, which when selected at the user input interface, plays a first audio signal at a first ISS system in the plurality of ISS systems with a first set of playback preferences, and a second audio signal at a second ISS system in the plurality of ISS systems with a second set of playback preferences.

4. The system as claimed in claim 1, wherein the plurality of listening modes further comprises an out-loud mode, which when selected at the user input interface, plays a first audio signal at one or more ISS systems in the plurality of ISS systems.

5. The system as claimed in claim 4, further comprising:

a first set of playback preferences for a first ISS system, wherein the audio signal is played back at the first ISS system using the first set of playback preferences; and a second set of playback preferences for a second ISS system, wherein the audio signal is played back at the second ISS system using the second set of playback preferences.

6. The system as claimed in claim 1, wherein the single transducer is arranged in a housing having an open back, in a headrest, and the single transducer is positioned within six inches of the head of the listener.

7. The system as claimed in claim 1, wherein the coherent listening environment is a vehicle cabin, and each ISS system corresponds to a seat in the vehicle cabin.

8. The system as claimed in claim 1, wherein the single transducer is for playback of the audio signal having a frequency less than 200 Hz.

9. A method for playback of an audio signal at an individual seat-based sound (ISS) system in a coherent listening environment having a plurality of ISS systems and a plurality of listening modes, a listening mode in the plurality of listening modes is selectable at each ISS system in the plurality of ISS systems, each ISS system in the plurality of ISS systems has a single transducer arranged at a head of a listener, the method comprising the steps of:

selecting, at an ISS system of interest, a listening mode from the plurality of listening modes;

selecting, at the ISS system of interest, a set of playback preferences for playing back the audio signal;

generating a crosstalk cancellation algorithm for the selected listening mode in the plurality of listening modes for the ISS system of interest in the plurality of ISS systems, the crosstalk cancellation algorithm is generated using impulse response measurements of the audio signal, taken only in an acoustical domain, of a transfer function between the audio signal directly after the single transducer in the ISS system of interest and the audio signal at the head of the listener in the ISS system of interest;

applying the crosstalk cancellation algorithm for the selected listening mode to the audio signal to be played back at the ISS system of interest; and playing back the audio signal at the single transducer of the ISS system of interest according to the set of playback preferences.

10. The method as claimed in claim 9, wherein the step of playing back the audio signal at the single transducer of the ISS system of interest further comprises arranging the single transducer within 6 inches of the head of the listener in the ISS system of interest.

11. The method as claimed in claim 10, wherein the step of arranging the single transducer of the ISS system of interest further comprises arranging the single transducer of the ISS system of interest so that a cross-talk path between the ISS system of interest and any other ISS system in the coherent listening environment is greater than a direct path from the single transducer to the head of the listener in the ISS system of interest.

12. The method as claimed in claim 9, wherein the step of playing back the audio signal further comprises playing back the audio signal for an audio signal having a frequency less than 200 Hz.

13. The method as claimed in claim 9, wherein the step of selecting a listening mode further comprises selecting a dark mode from the plurality of listening modes and the step of generating a crosstalk cancellation algorithm further comprises generating a crosstalk cancellation algorithm that cancels out, at the ISS system of interest, any audio signal being played back at any other ISS system in the plurality of ISS systems.

14. The method as claimed in claim 9, wherein the step of selecting a listening mode further comprises selecting a personal mode from the plurality of listening modes and the step of generating a crosstalk cancellation algorithm further comprises generating a crosstalk cancellation algorithm that plays back a first audio signal at the ISS system of interest and cancels out, at the ISS system of interest, any other audio signal being played back at all of the other ISS systems.

15. The method as claimed in claim 9, wherein the step of selecting a listening mode further comprises selecting an out-loud mode from the plurality of listening modes and the step of generating a crosstalk cancellation algorithm further comprises generating a crosstalk cancellation algorithm that plays back the audio signal at one or more ISS systems including the ISS system of interest.

16. The method as claimed in claim 15, wherein the step of playing back the audio signal further comprises playing back the audio signal according to a set of playback preferences for each ISS system, the set of playback preferences for each ISS system is independent of the sets of playback preferences for each of the other ISS systems in the plurality of ISS systems.

* * * * *